O. O. WITHERELL.
Chain-Pump Buckets.

No. 151,185. Patented May 19, 1874.

WITNESSES.

INVENTOR.

UNITED STATES PATENT OFFICE.

ORIN O. WITHERELL, OF TOLEDO, OHIO.

IMPROVEMENT IN CHAIN-PUMP BUCKETS.

Specification forming part of Letters Patent No. 151,185, dated May 19, 1874; application filed May 9, 1874.

*To all whom it may concern:*

Be it known that I, ORIN O. WITHERELL, of Toledo, in the county of Lucas and State of Ohio, have invented a new and valuable Improvement in Pump Valves and Pistons; and do hereby declare that the following is a full, clear, and exact description of the construction and operation of the same, reference being had to the annexed drawings, making a part of this specification, and to the letters and figures of reference marked thereon.

Figure 1:
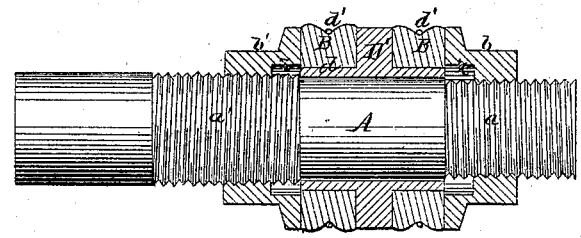
Figure 2:
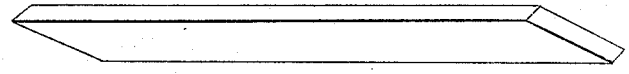
Figure 3:
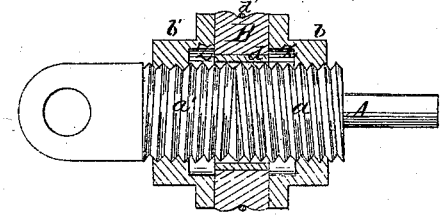

Figure 1 of the drawings is a representation of a longitudinal section of my invention. Fig. 2 is a detail view of my invention. Fig. 3 is a sectional view of my invention.

This invention has relation to that class of chain-pump valves or buckets having an india-rubber cushion or packing placed on a stem and held between two metallic caps; and it consists in constructing said stem with a right-and-left-hand screw, and in adapting the caps thereto, so that by turning both caps in the same direction the packing may be expanded to the proper dimensions. This invention also consists in placing a metallic collar on the valve-stem, to prevent the india-rubber from coming in contact therewith, and in recessing the caps to receive said collar when the caps are brought toward each other. This invention lastly consists in encircling the india-rubber packing with a band of wire, so arranged that when the rubber is compressed by the caps a channel shall be produced around said rubber, which channel is designed to receive and hold any particles of dirt which may get into the pump, and also to contain a small quantity of water to serve as a packing to the valve.

Referring to the accompanying drawings, A designates the stem of a chain-pump valve, upon which are cut the right-and-left-hand screws $a$ $a'$, holding the adjustable caps $b$ $b'$, the turning of which in one direction will bring them toward each other, or vice versa. B represents an india-rubber ring, placed over the stem between said caps, and prevented from being brought in contact with the stem by means of a metallic ring or collar, $d$. The ring B may be of a continuous form, or it may be produced from a strip of rubber of the shape shown in Fig. 2. The external diameter of the ring B is about equal to that of the caps, which nearly fill the bore of the pump. The rubber is expanded to the prober diameter by adjusting the caps—a work speedily accomplished by taking hold of both caps in one hand and the stem in the other, and turning the former in the same direction. The caps are recessed at $x$, so that the ring or collar $d$ may not interfere with their adjustment. The collar $d$ is an important feature of this invention, as without it the rubber would be liable to catch on the threads of the stem, or to be so pressed against the stem as to create a great amount of friction. $d'$ designates a wire band encircling the rubber packing. This band serves to hold the rubber in place, and to produce a channel when the rubber is expanded for the purpose hereinbefore specified. This band is particularly useful for the purpose of holding the packing when the same is formed from a strip of rubber. With some slight modification my improvement may be applied to the pistons of force-pumps. In such cases two india-rubber bands are used, as shown in Fig. 1, and the collar $d$ enlarged and constructed with a flange, $D'$, designed to separate the rubber bands. The stem having a right-and-left-hand screw, and the caps fitting thereon, constitute a valuable improvement in pump-valves, for the purpose of expanding the rubber packing. In other pump-valves when the parts become rusted so as to adhere together, the force applied to the caps comes directly upon the rubber, and tends to expand it unequally, and to throw it out of "round." My improvement entirely avoids this difficulty.

What I claim as my invention, and desire to secure by Letters Patent, is—

1. The pump-valve, having a right-and-left-hand screw cut on its stem, and provided with the adjustable caps $b$ $b'$ and india-rubber packing B, substantially as specified.

2. The collar $d$, in combination with the stem A, packing B, and adjustable recessed caps $b$ $b'$, substantially as specified.

3. The collar $d$, having the flange $D'$, in combination with a pump-valve having double packing B, adjustable caps $b$ $b'$, substantially as specified.

In testimony that I claim the above I have hereunto subscribed my name in the presence of two witnesses.

ORIN O. WITHERELL.

Witnesses:
CHARLEY H. McCARON,
H. S. CLARK.